(12) United States Patent
Lu (10) Patent No.: US 12,258,930 B1
(45) Date of Patent: Mar. 25, 2025

(54) SIPHONAGE HYDROELECTRIC GENERATION DEVICE WITH SCREW TURBINE

(71) Applicant: Shun-Tsung Lu, Taichung (TW)

(72) Inventor: Shun-Tsung Lu, Taichung (TW)

( * ) Notice: Subject to any disclaimer, the term of this patent is extended or adjusted under 35 U.S.C. 154(b) by 0 days.

(21) Appl. No.: 18/623,519

(22) Filed: Apr. 1, 2024

(51) Int. Cl.
*F03B 13/08* (2006.01)
*F03B 3/04* (2006.01)

(52) U.S. Cl.
CPC .............. *F03B 13/086* (2013.01); *F03B 3/04* (2013.01); *F05B 2240/243* (2013.01)

(58) Field of Classification Search
CPC ..... F03B 13/086; F03B 3/04; F05B 2240/243
USPC ................................................. 290/43, 54
See application file for complete search history.

(56) References Cited

U.S. PATENT DOCUMENTS

| | | | | |
|---|---|---|---|---|
| 4,180,976 A | * | 1/1980 | Bunn | F03B 13/086 290/43 |
| 4,182,123 A | * | 1/1980 | Ueda | F03B 13/086 137/123 |
| 6,083,382 A | * | 7/2000 | Bird | B01D 61/06 210/170.11 |
| 8,492,918 B1 | * | 7/2013 | Kamenov | F03D 9/255 290/43 |
| 11,959,452 B1 | * | 4/2024 | Suddaby | F03B 13/1815 |
| 2012/0187692 A1 | * | 7/2012 | Walton | F03B 13/08 290/54 |

FOREIGN PATENT DOCUMENTS

| | | | | |
|---|---|---|---|---|
| DE | 202010004056 U1 | * | 7/2010 | ............ F03B 13/06 |
| EP | 2461016 A1 | * | 6/2012 | ............ F03B 11/02 |
| IN | 202411049384 A | * | 7/2024 | |
| WO | WO-2009020386 A1 | * | 2/2009 | ............ F03B 13/06 |
| WO | WO-2023079480 A1 | * | 5/2023 | ........... B01D 1/0035 |

* cited by examiner

*Primary Examiner* — Charles Reid, Jr.
(74) *Attorney, Agent, or Firm* — RABIN & BERDO, P.C.

(57) ABSTRACT

A siphonage hydroelectric generation device has a water source, a storage tank fluidly communicating with the water source via a first siphon pipe, at least one channel fluidly communicating with the storage tank and extending obliquely and downwardly, at least one screw turbine disposed in the at least one channel, and at least one power generator connected to the at least one screw turbine. Each first siphon pipe has a siphoning inlet end portion inserted into the storage tank and a siphoning outlet end portion fluidly communicating with a corresponding one of the at least one channel. An end opening of the siphoning outlet end portion is lower than a water level of the storage tank. The at least one channel can receive a stable volume of water from the storage tank via the first siphon pipe by siphonage for stable power generation.

20 Claims, 8 Drawing Sheets

SIPHONAGE HYDROELECTRIC GENERATION DEVICE WITH SCREW TURBINE

BACKGROUND OF THE INVENTION

1. Field of the Invention

The present invention relates to a hydroelectric generation device, and more particularly to a hydroelectric generation device that can provide stable volume of water for hydroelectric generation utilizing siphonage.

2. Description of Related Art

A conventional hydroelectric generation device is driven to generate power via water level differences in nature. Whereby, a blade wheel of a water turbine is driven to spin by running water to drive a power generator to generate power.

The conventional hydroelectric generation device is driven mostly by water source from a natural river or a reservoir upstream of a river to generate power. However, there are many aquatic creatures living in the river or the reservoir. There are also foreign matters, such as crushed stones, loam sands, dead branches, fallen leaves, and drifting objects, carried by the running water. Therefore, the aquatic creatures living in the river or the reservoir and the foreign matters carried by the running water may be led into the conventional hydroelectric generation device with the running water directly from the river or the reservoir. The ecology of water sources is affected accordingly. In addition, the conventional hydroelectric generation device is easily damaged by the running water carrying the foreign matters flowing into the conventional hydroelectric generation device, and thereby service life of the conventional hydroelectric generation device is decreased.

Moreover, the conventional hydroelectric generation device requires an adequate amount of water volume for power generation. During dry season, water level is low and water volume decreases, the conventional hydroelectric generation device may not generate power effectively. Accordingly, the conventional hydroelectric generation device is susceptible to seasonal and weather changes and cannot be supplied with a stable volume of water for stable and continuous power generation.

To overcome the shortcomings, the present invention tends to provide a siphonage hydroelectric generation device with a screw turbine to mitigate or obviate the aforementioned problems.

SUMMARY OF THE INVENTION

The main objective of the invention is to provide a hydroelectric generation device which can provide stable volume of water by siphonage for continuous and stable power generation.

A siphonage hydroelectric generation device comprises a water source, a storage tank, a filter, at least one channel, at least one screw turbine, and at least one first siphon pipe. The water source has a first water level. The storage tank fluidly communicates with the water source and has a second water level being lower than the first water level of the water source. The filter is disposed between the water source and the storage tank. The at least one channel fluidly communicates with the storage tank and extends obliquely and downwardly from the storage tank. The at least one screw turbine is disposed in the at least one channel and extends obliquely and downwardly. Each of the at least one screw turbine includes a spinning shaft and a spiral blade extending spirally. The at least one power generator is connected to the at least one screw turbine. The at least one channel fluidly communicates with the storage tank via the at least one first siphon pipe. Each of the at least one first siphon pipe has a siphoning inlet end portion inserted into the storage tank and extending upwardly and a siphoning outlet end portion fluidly communicating with a corresponding one of the at least one channel, extending upwardly, and fluidly communicating with the siphoning inlet end portion. The siphoning outlet end portion has an end opening being lower than the second water level of the storage tank.

Other objects, advantages and novel features of the invention will become more apparent from the following detailed description when taken in conjunction with the accompanying drawings.

DETAILED DESCRIPTION OF PREFERRED EMBODIMENT

Figure 1:
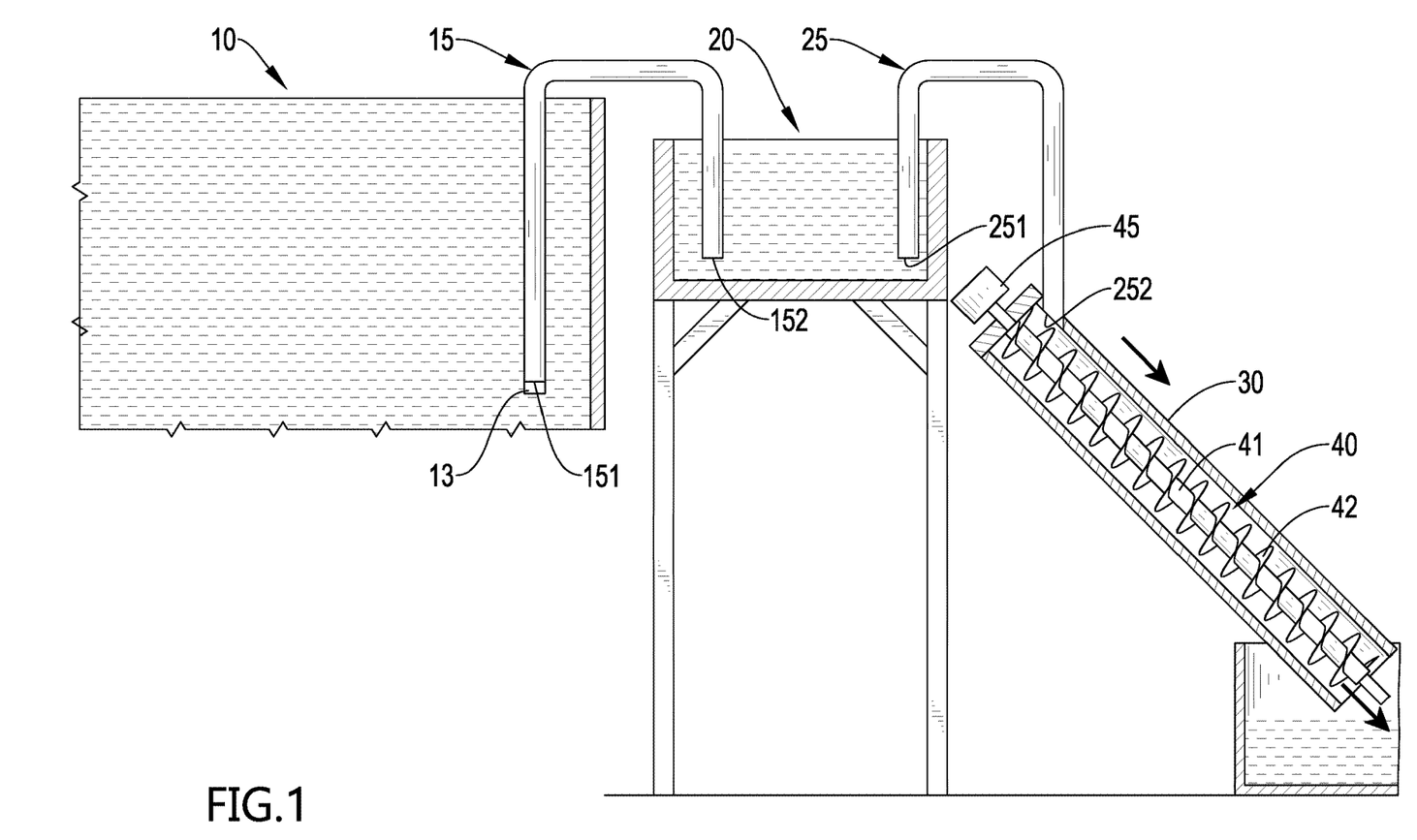
FIG. 1 is a schematic diagram of a first embodiment of a siphonage hydroelectric generation device in accordance with the present invention.
Figure 2:
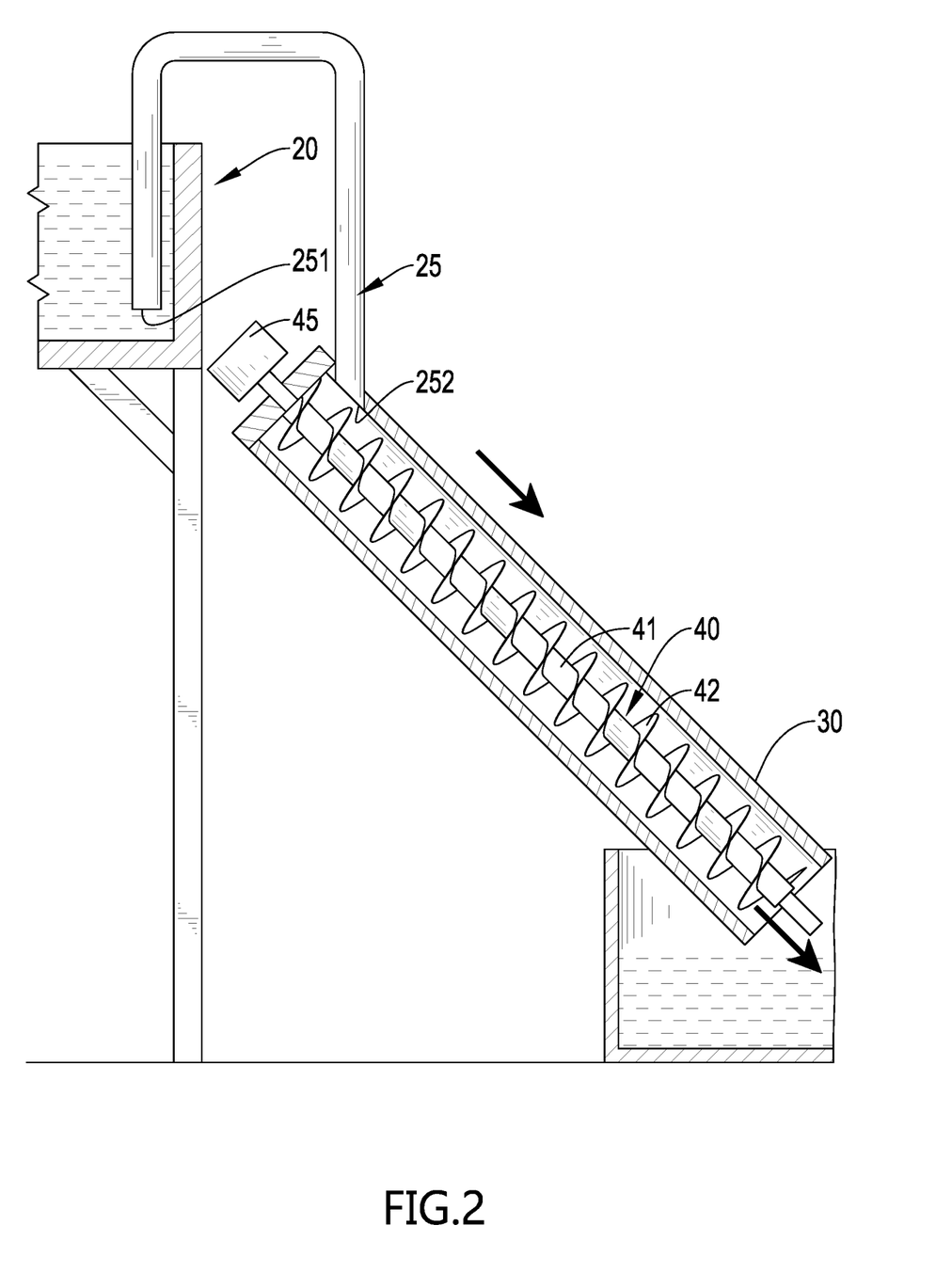
FIG. 2 is an enlarged schematic diagram of the siphonage hydroelectric generation device in FIG. 1.

With reference to FIGS. 1 and 2, a first embodiment of a siphonage hydroelectric generation device in accordance with the present invention has a water source 10, a storage tank 20, at least one channel 30, at least one screw turbine 40, at least one power generator 45, and at least one first siphon pipe 25.

The water source 10 has a first water level. The storage tank 20 fluidly communicates with the water source 10. A filter 13 is disposed between the storage tank 20 and the water source 10 to prevent the aquatic creatures and foreign matters in the water source 10 from flowing into the storage tank 20. Therefore, filtered water can be stored in the storage tank 20. The storage tank 20 has a second water level being lower than the first water level of the water source 10. So the water in the water source 10 can continuously flow toward the storage tank 20. The water source 10 may fluidly communicate with the storage tank 20 via a communicating pipe 15. The communicating pipe 15 is inverted U-shaped and has a communicating inlet end portion 151 and a communicating outlet end portion 152. The communicating inlet end portion 151 is inserted into the water source 10 and extends upwardly. The communicating outlet end portion 152 is inserted into the storage tank 20, extends upwardly, and fluidly communicates with the communicating inlet end portion 151. An end opening of the communicating outlet end portion 152 is lower than the first water level of the water source 10. Therefore, after air inside the communicating pipe 15 is exhausted, water in the water source 10 can continuously flow toward the storage tank 20 by siphonage.

The at least one channel 30 fluidly communicates with the storage tank 20 and extends obliquely and downwardly from the storage tank 20. The at least one screw turbine 40 is disposed in the at least one channel 30 respectively. Each screw turbine 40 includes a spinning shaft 41 and a spiral blade 42 extending spirally. The spinning shaft 41 of each screw turbine 40 extends obliquely and downwardly along a corresponding one of the at least one channel 30. The spiral blade 42 spirally extends around the spinning shaft 41. The at least one power generator 45 is connected to the at least one screw turbine 40 respectively.

The at least one channel 30 fluidly communicates with the storage tank 20 via the at least one first siphon pipe 25 respectively. Each first siphon pipe 25 is inverted U-shaped and has a siphoning inlet end portion 251 and a siphoning outlet end portion 252. The siphoning inlet end portion 251 is inserted into the storage tank 20, is adjacent to a bottom of the storage tank 20, is spaced apart from the bottom of the storage tank 20, and extends upwardly. The siphoning outlet end portion 252 fluidly communicates with a corresponding channel 30, extends upwardly, and fluidly communicates with the siphoning inlet end portion 251. An end opening of the siphoning outlet end portion 252 is lower than the second water level of the storage tank 20.

Since the end opening of the siphoning outlet end portion 252 is lower than the second water level of the storage tank 20. After air inside the first siphon pipe 25 is exhausted and the second water level of the storage tank 20 is higher than the end opening of the siphoning outlet end portion 252, water in the storage tank 20 can continuously flow toward the first siphon pipe 25 and flow into the channel 30 via the siphoning outlet end portion 252 by siphonage. During the water flowing from a higher position toward a lower position, the spiral blade 42 of the screw turbine 40 is pushed by the running water, thereby driving the screw turbine 40 to spin to drive the power generator 45 to generate power. Specifically, an air pump may be connected to the first siphon pipe 25 for exhausting air inside the first siphon pipe 25.

Figure 3:
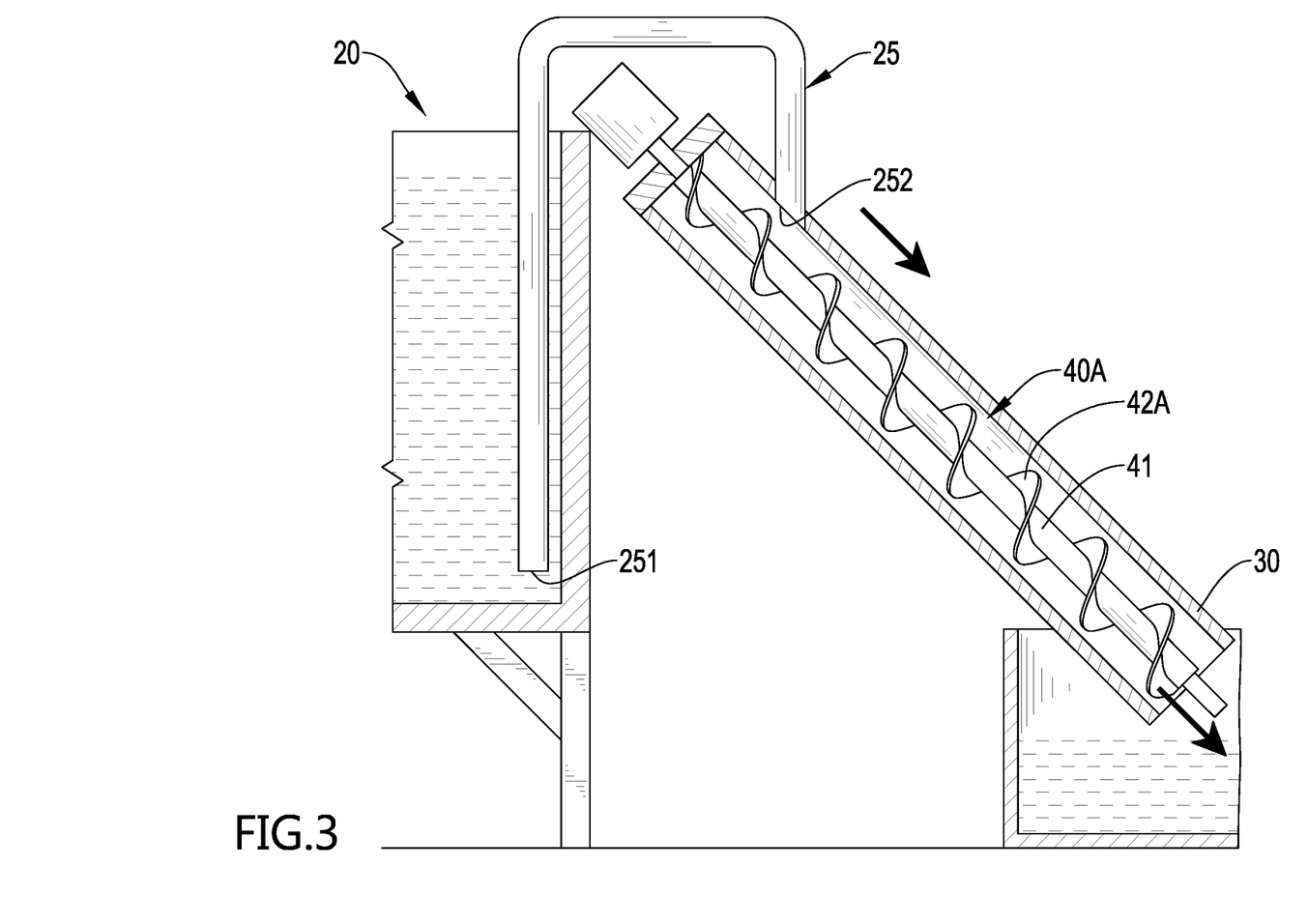
FIG. 3 is an enlarged schematic diagram of a second embodiment of a siphonage hydroelectric generation device in accordance with the present invention.

With reference to FIGS. 1 and 2, in the first embodiment, the spiral blade 42 of the screw turbine 40 is a spiral blade with a constant pitch and a constant blade diameter. With reference to FIG. 3, in the second embodiment, the spiral blade 42A of the screw turbine 40A is a spiral blade with a constant pitch and non-constant blade diameter. A diameter of an end of the spiral blade 42A being adjacent to a top of the channel 30 is smaller than a diameter of an end of the spiral blade 42A away from the top of the channel 30. Whereby, while the water flowing into the channel 30 from the first siphon pipe 25, resistance encountered to the water is less at the top of the channel 30, and the water can smoothly flow down accordingly. In the first or second embodiment, a screw turbine 40, 40A may be disposed in each channel 30. Therefore, during the water flowing down along the channel 30, the water is able to drive a screw turbine 40, 40A to spin.

Figure 4:
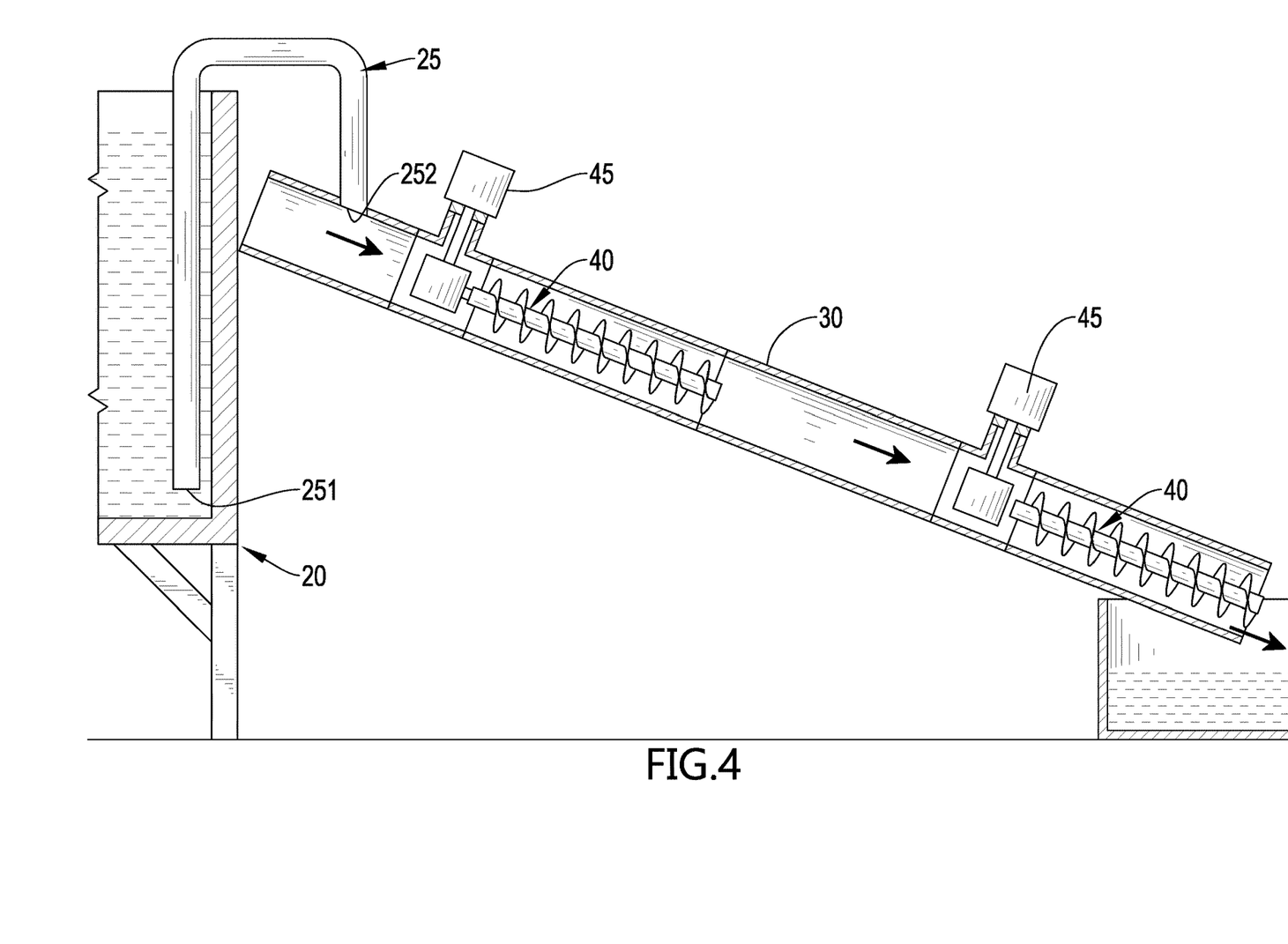
FIG. 4 is an enlarged schematic diagram of a third embodiment of a siphonage hydroelectric generation device in accordance with the present invention.

With reference to FIG. 4, in the third embodiment, multiple said screw turbines 40 may be arranged in one said channel 30 at spaced intervals, and each of the screw turbines 40 is connected to a corresponding power generator 45. Therefore, during the water flowing down along the channel 30, the multiple screw turbines 40 are driven by the water to spin, and thereby the multiple power generators 45 are driven to generate power.

Figure 5:
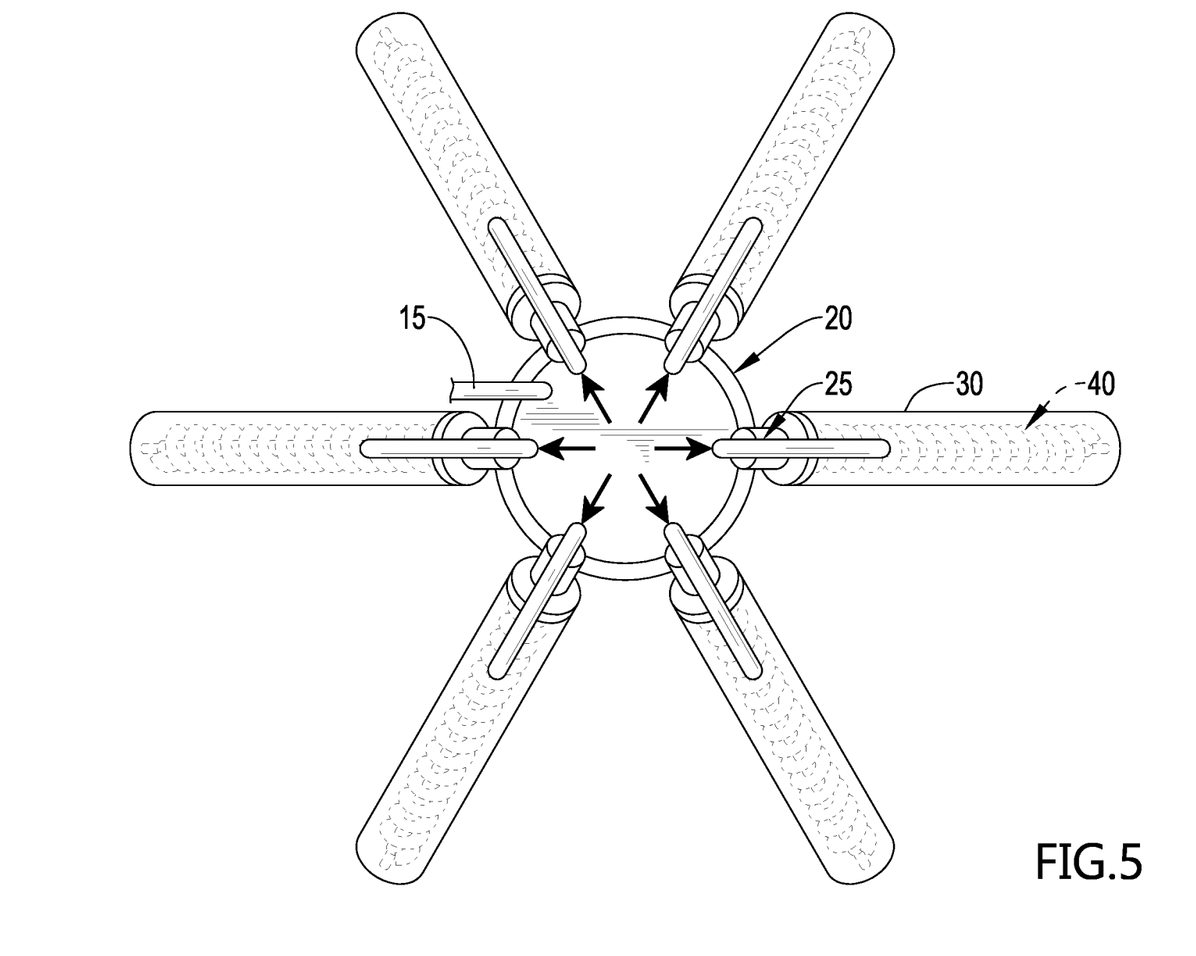
FIG. 5 is a top-view schematic diagram of a fourth embodiment of a siphonage hydroelectric generation device in accordance with the present invention.
Figure 6:
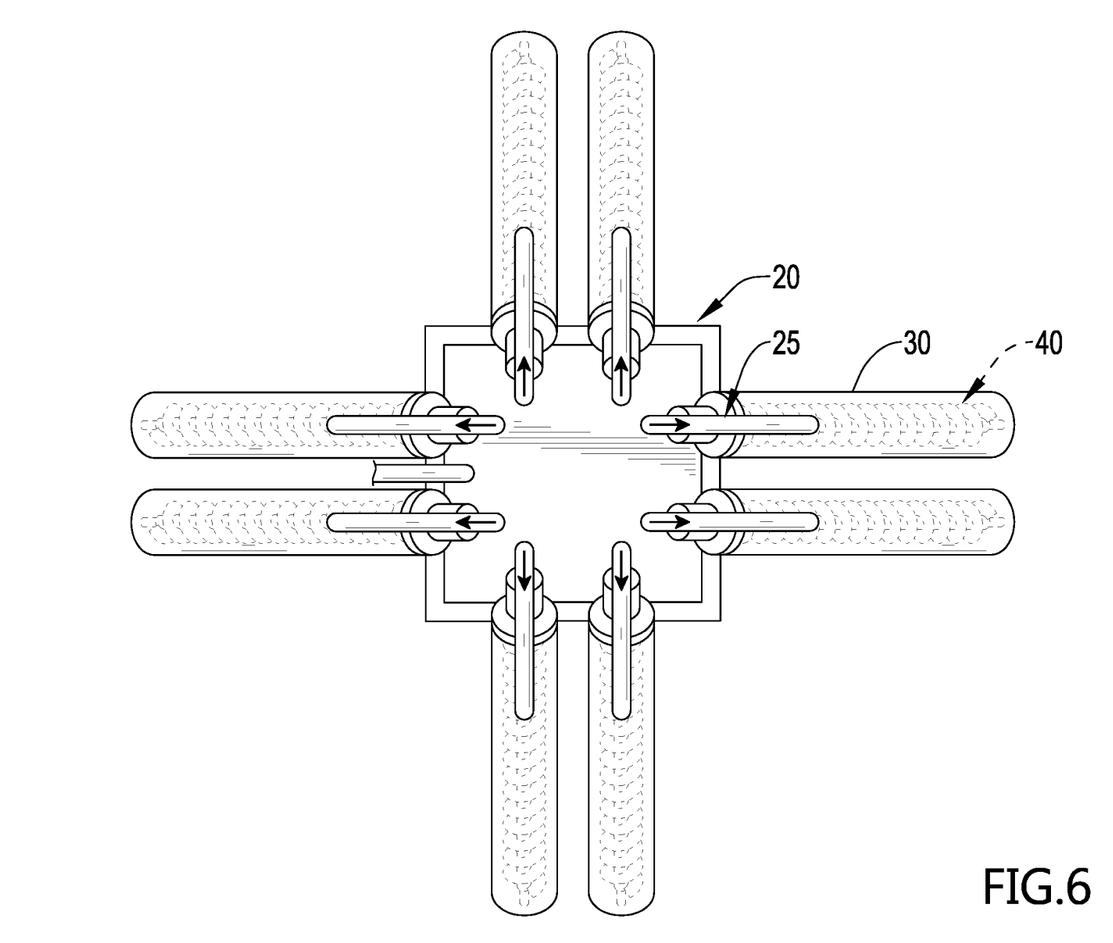
FIG. 6 is a top-view schematic diagram of a fifth embodiment of a siphonage hydroelectric generation device in accordance with the present invention.

With reference to FIGS. 5 and 6, multiple said channels 30 may be arranged around the storage tank 20 at angular intervals. Each channel 30 fluidly communicates with the storage tank 20 via a corresponding said first siphon pipe 25. Therefore, the water in the storage tank 20 can be led to the multiple channels 30 via the multiple first siphon pipes 25, and thereby the screw turbines 40 disposed in the multiple channels 30 can be driven to spin for power generation. Wherein, the storage tank 20 may be cylindrical as shown in FIG. 5 or rectangular as shown in FIG. 6.

Figure 7:
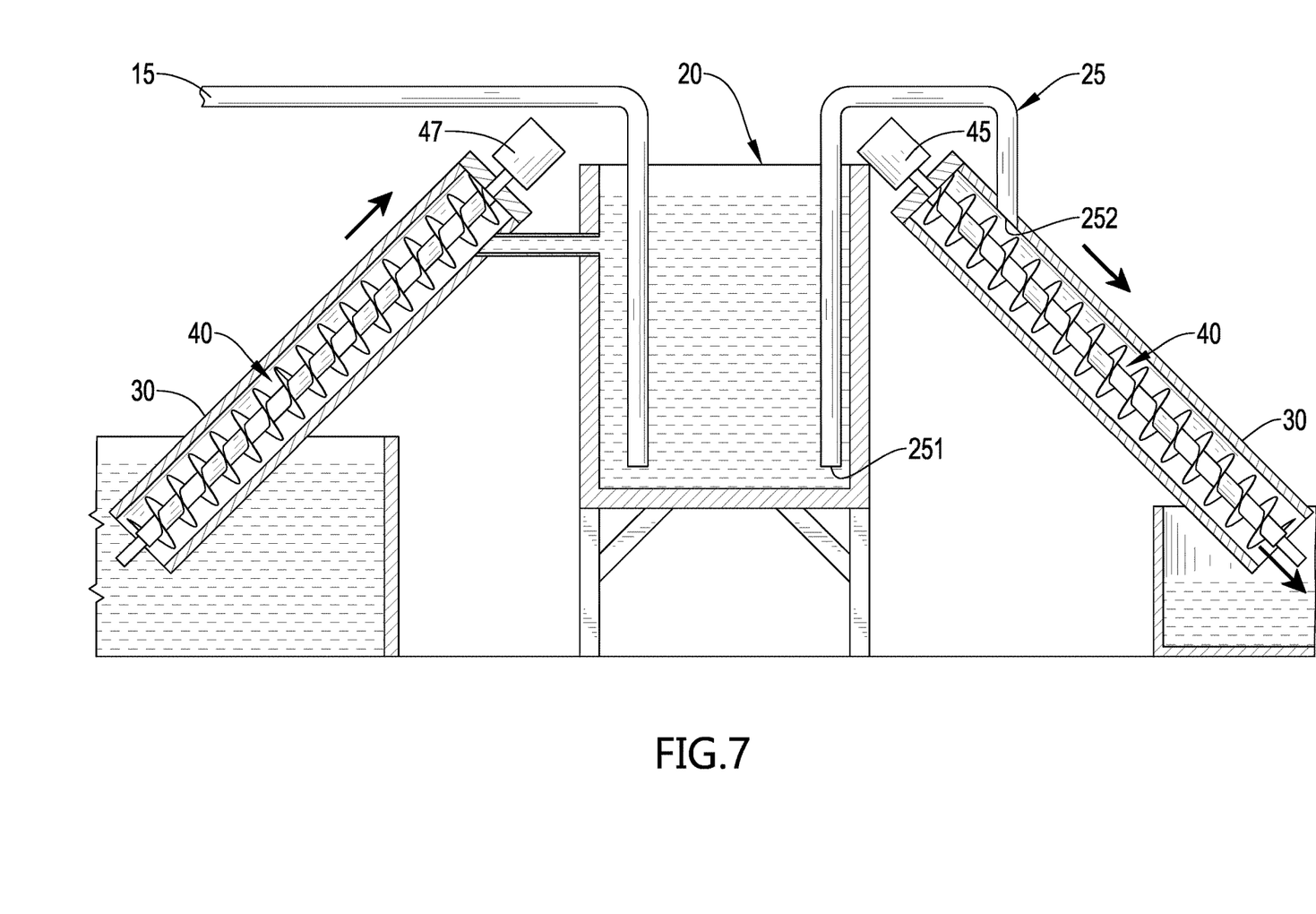
FIG. 7 is a schematic diagram of a sixth embodiment of a siphonage hydroelectric generation device in accordance with the present invention.

With reference to FIG. 7, in the sixth embodiment, the siphonage hydroelectric generation device comprises multiple said channels 30 fluidly communicating with the storage tank 20, and multiple said screw turbines 40 respectively disposed in the multiple channels 30, said at least one power generator 45, at least one driving device 47, and said at least one first siphon pipe 25. Wherein, each power generator 45 and each driving device 47 are connected to respective screw turbines 40. Each driving device 47 is configured to drive the screw turbine 40 connected thereto for reversely spinning, thereby water being carried from a lower water source upwardly along the channel 30 and flowing into the storage tank 20. Each channel 30, equipped with the screw turbine 40 and the power generator 45 connected together, fluidly communicates with the storage tank 20 via one of the first siphon pipes 25. Therefore, when the storage tank 20 is sufficient, the water in the storage tank 20 is led to the channels 30 equipped with the screw turbine 40 and the power generator 45 connected together, for power generation. When a water level in the storage tank 20 is low, the screw turbine 40 connected to the driving device 47 can be driven to carry the water in a lower water source to flow into the storage tank 20 to keep the water level for generating power continuously.

Figure 8:
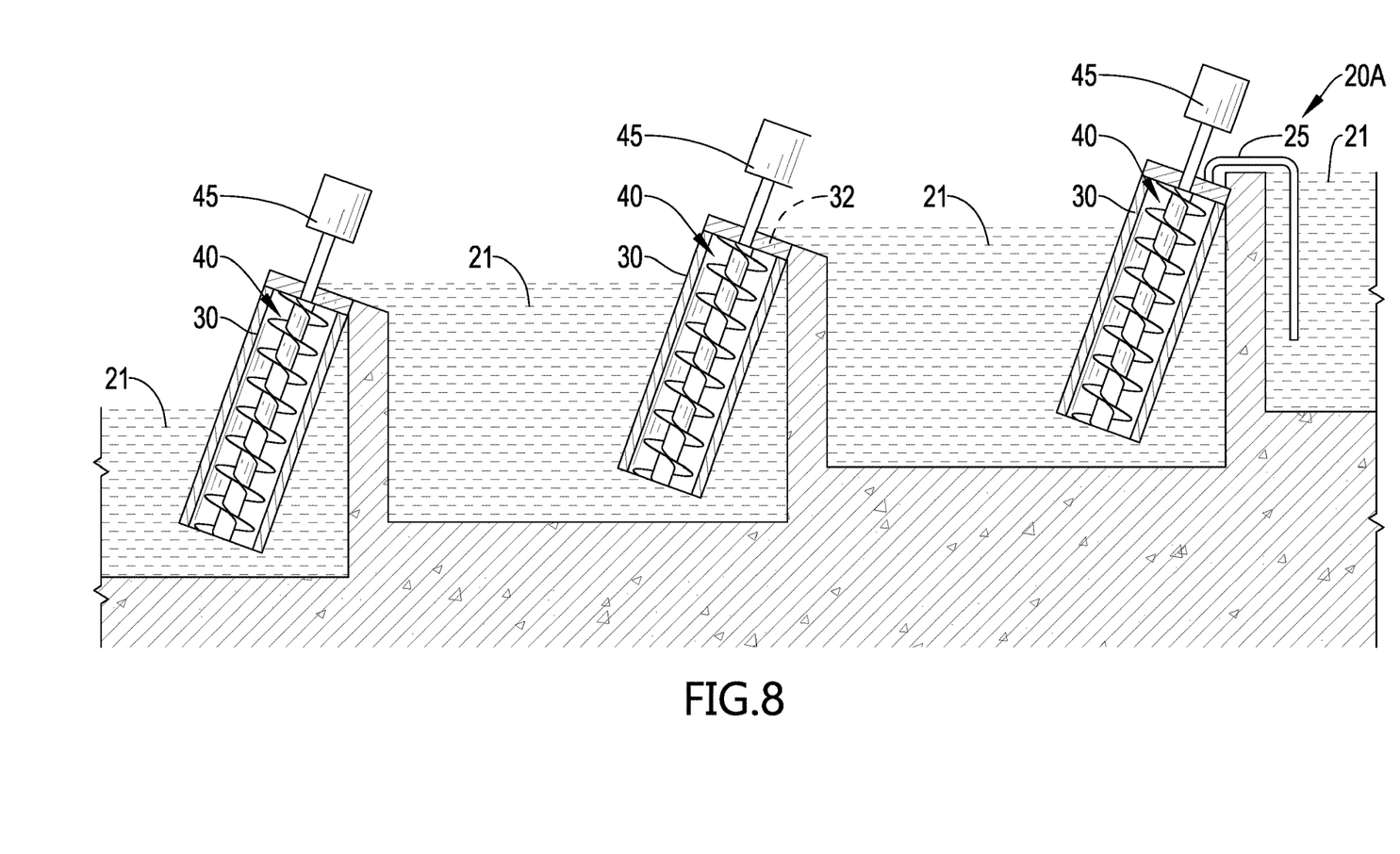
FIG. 8 is a schematic diagram of a seventh embodiment of a siphonage hydroelectric generation device in accordance with the present invention.

With reference to FIG. 8, the siphonage hydroelectric generation device may be applied to a stepped storage tank 20A as shown in FIG. 8. The storage tank 20A includes multiple stepped troughs 21 fluidly communicating with one another and having water levels in a gradually descending arrangement. Two of the stepped troughs 21 being adjacent to each other fluidly communicate with each other via a respective channel 30 extending obliquely and downwardly into a lower one of the two stepped troughs 21. A said screw turbine 40 is disposed in each channel 30 and is connected to one said power generator 45. At least one of the channels 30 fluidly communicates with a corresponding one said stepped trough 21 via one said first siphon pipe 25. Therefore, during the water flowing downward step by step along the multiple stepped troughs 21 of the storage tank 20A, the water may pass through the multiple channels 30, where the screw turbines 40 are disposed therein, for power generation. In addition, water in some of the multiple stepped troughs 21 may flow into inlets 32 of the corresponding channels 30 by overflowing, thereby driving the screw turbines 40 disposed in the channels 30 to spin.

With the forgoing arrangement, the water in the water source 10 can flow into the storage tank 20 continuously and is filtered by the filter 13 before flowing into the storage tank 20 to prevent the aquatic organism and debris in the water source 10 from flowing into the storage tank 20. The water in the storage tank 20 can be led to the channel 30 via the first siphon pipe 25 by siphonage, to impact the spiral blade 42 of the screw turbine 40 to drive the screw turbine 40 to spin, thereby driving the power generator 45 connected to the screw turbine 40 to generate power. Since the water in the storage tank 20 is led to the channel 30 via the first siphon pipe 25, the channel 30 can receive stable volume water for stable power generation. Whereby, impact to the ecological environment for fish living in the water sources 10 is reduced, and foreign matters can be prevented from flowing into the channel 30 to damage the screw turbine 40.

What is claimed is:

1. A siphonage hydroelectric generation device comprising:
   a water source having a first water level;
   a storage tank fluidly communicating with the water source and having a second water level being lower than the first water level of the water source;
   a filter disposed between the water source and the storage tank;
   at least one channel fluidly communicating with the storage tank and extending obliquely and downwardly from the storage tank;
   at least one screw turbine disposed in the at least one channel and extending obliquely and downwardly, each of the at least one screw turbine including
      a spinning shaft; and
      a spiral blade extending spirally;
   at least one power generator connected to the at least one screw turbine; and
   at least one first siphon pipe, the at least one channel fluidly communicating with the storage tank via the at least one first siphon pipe; each of the at least one first siphon pipe having
      a siphoning inlet end portion inserted into the storage tank and extending upwardly; and
      a siphoning outlet end portion fluidly communicating with a corresponding one of the at least one channel, extending upwardly, and fluidly communicating with the siphoning inlet end portion, the siphoning outlet end portion having an end opening being lower than the second water level of the storage tank.

2. The siphonage hydroelectric generation device as claimed in claim 1, wherein each of the at least one channel has one said screw turbine disposed therein.

3. The siphonage hydroelectric generation device as claimed in claim 2, wherein the spiral blade of each of the at least one screw turbine is a spiral blade with a constant pitch and a constant blade diameter.

4. The siphonage hydroelectric generation device as claimed in claim 2, wherein
   the spiral blade of each of the at least one screw turbine is a spiral blade with a constant pitch and non-constant blade diameter; and
   a diameter of an end of the spiral blade of each of the at least one screw turbine being adjacent to a top of a corresponding one of the at least one channel is smaller than a diameter of an end of the spiral blade away from the top of the corresponding one of the at least one channel.

5. The siphonage hydroelectric generation device as claimed in claim 2, wherein
   the water source fluidly communicates with the storage tank via a communicating pipe;
   the communicating pipe is inverted U-shaped and has
      a communicating inlet end portion inserted into the water source and extending upwardly; and
      a communicating outlet end portion inserted into the storage tank, extending upwardly, and fluidly communicating with the communicating inlet end portion; and
      an end opening of the communicating outlet end portion is lower than the first water level of the water source.

6. The siphonage hydroelectric generation device as claimed in claim 1, wherein the at least one screw turbine includes multiple said screw turbines arranged along each of the at least one channel at spaced intervals.

7. The siphonage hydroelectric generation device as claimed in claim 6, wherein the spiral blade of each of the at least one screw turbine is a spiral blade with a constant pitch and a constant blade diameter.

8. The siphonage hydroelectric generation device as claimed in claim 6, wherein
   the spiral blade of each of the at least one screw turbine is a spiral blade with a constant pitch and non-constant blade diameter; and
   a diameter of an end of the spiral blade of each of the at least one screw turbine being adjacent to a top of a corresponding one of the at least one channel is smaller than a diameter of an end of the spiral blade away from the top of the corresponding one of the at least one channel.

9. The siphonage hydroelectric generation device as claimed in claim 1, wherein
   the at least one channel includes multiple said channels arranged around the storage tank at angular intervals; and
   each of said channels fluidly communicates with the storage tank via one of the at least one first siphon pipe.

10. The siphonage hydroelectric generation device as claimed in claim 9, wherein the spiral blade of each of the at least one screw turbine is a spiral blade with a constant pitch and a constant blade diameter.

11. The siphonage hydroelectric generation device as claimed in claim 9, wherein
    the spiral blade of each of the at least one screw turbine is a spiral blade with a constant pitch and non-constant blade diameter; and
    a diameter of an end of the spiral blade of each of the at least one screw turbine being adjacent to a top of a corresponding one of the at least one channel is smaller than a diameter of an end of the spiral blade away from the top of the corresponding one of the at least one channel.

12. The siphonage hydroelectric generation device as claimed in claim 1, wherein
    the siphonage hydroelectric generation device comprises at least one driving device;
    the at least one channel includes multiple said channels respectively fluidly communicating with the storage tank;
    the at least one screw turbine includes multiple said screw turbines respectively disposed in the multiple channels; and
    each power generator and each driving device are connected to respective said screw turbines.

13. The siphonage hydroelectric generation device as claimed in claim 12, wherein the spiral blade of each of the at least one screw turbine is a spiral blade with a constant pitch and a constant diameter.

14. The siphonage hydroelectric generation device as claimed in claim 12, wherein the spiral blade of each of the at least one screw turbine is a spiral blade with a constant pitch and non-constant blade diameter; and a diameter of an end of the spiral blade of each of the at least one screw turbine being adjacent to a top of a corresponding one of the at least one channel is smaller than a diameter of an end of the spiral blade away from the top of the corresponding one of the at least one channel.

15. The siphonage hydroelectric generation device as claimed in claim 1, wherein
    the storage tank is a stepped storage tank and includes multiple stepped troughs fluidly communicating with one another and having water levels in a gradually descending arrangement;
    two of the stepped troughs being adjacent to each other fluidly communicate with each other via one of the at least one channel extending obliquely and downwardly into a lower one of the two stepped troughs; and
    one of the at least one screw turbine is disposed in each of the at least one channel.

16. The siphonage hydroelectric generation device as claimed in claim 15, wherein the spiral blade of each of the at least one screw turbine is a spiral blade with a constant pitch and a constant blade diameter.

17. The siphonage hydroelectric generation device as claimed in claim 15, wherein
    the spiral blade of each of the at least one screw turbine is a spiral blade with a constant pitch and non-constant blade diameter; and
    a diameter of an end of the spiral blade of each of the at least one screw turbine being adjacent to a top of a corresponding one of the at least one channel is smaller than a diameter of an end of the spiral blade away from the top of the corresponding one of the at least one channel.

18. The siphonage hydroelectric generation device as claimed in claim 1, wherein the spiral blade of each of the at least one screw turbine is a spiral blade with a constant pitch and a constant blade diameter.

19. The siphonage hydroelectric generation device as claimed in claim 1, wherein
    the spiral blade of each of the at least one screw turbine is a spiral blade with a constant pitch and non-constant blade diameter; and
    a diameter of an end of the spiral blade of each of the at least one screw turbine being adjacent to a top of a corresponding one of the at least one channel is smaller than a diameter of an end of the spiral blade away from the top of the corresponding one of the at least one channel.

20. The siphonage hydroelectric generation device as claimed in claim 1, wherein
    the water source fluidly communicates with the storage tank via a communicating pipe;
    the communicating pipe is inverted U-shaped and has
        a communicating inlet end portion inserted into the water source and extending upwardly; and
        a communicating outlet end portion inserted into the storage tank, extending upwardly, and fluidly communicating with the communicating inlet end portion; and
        an end opening of the communicating outlet end portion is lower than the first water level of the water source.

* * * * *